US010132382B2

(12) United States Patent
Park

(10) Patent No.: US 10,132,382 B2
(45) Date of Patent: Nov. 20, 2018

(54) VIBRATION DAMPER FOR HIGH LOAD

(71) Applicant: DAEDONG ENGINEERING CO., LTD., Goyang (KR)

(72) Inventor: Jeong Yel Park, Goyang (KR)

(73) Assignee: DAEDONG ENGINEERING CO., LTD., Goyang-si (KR)

( * ) Notice: Subject to any disclaimer, the term of this patent is extended or adjusted under 35 U.S.C. 154(b) by 151 days.

(21) Appl. No.: 14/891,737

(22) PCT Filed: Apr. 24, 2014

(86) PCT No.: PCT/KR2014/003607
§ 371 (c)(1),
(2) Date: Nov. 17, 2015

(87) PCT Pub. No.: WO2015/122568
PCT Pub. Date: Aug. 20, 2015

(65) Prior Publication Data
US 2016/0356339 A1    Dec. 8, 2016

(30) Foreign Application Priority Data

Feb. 12, 2014 (KR) .................... 10-2014-0016270

(51) Int. Cl.
*F16F 15/08* (2006.01)
*E02F 5/32* (2006.01)
(Continued)

(52) U.S. Cl.
CPC ............ *F16F 15/08* (2013.01); *E02F 3/3609* (2013.01); *E02F 3/3618* (2013.01);
(Continued)

(58) Field of Classification Search
CPC .. B25D 17/28; E02F 5/32; E02F 5/323; E02F 5/326; E02F 5/36; E02F 5/3604;
(Continued)

(56) References Cited

U.S. PATENT DOCUMENTS

| | | | | |
|---|---|---|---|---|
| 5,195,865 | A | * | 3/1993 | Koehl .................... E02F 3/3636 172/40 |
| 8,276,681 | B2 | * | 10/2012 | Park ....................... E02F 5/326 172/40 |
| 2012/0187744 | A1 | * | 7/2012 | Lahidalga ............... E02F 5/323 299/37.4 |

FOREIGN PATENT DOCUMENTS

| | | | | | |
|---|---|---|---|---|---|
| FR | 2 609 296 | * | 8/1988 | ............... | E02F 3/14 |
| JP | 9-105236 | * | 4/1997 | ............ | E04G 23/08 |

(Continued)

*Primary Examiner* — Michael P Ferguson
(74) *Attorney, Agent, or Firm* — Lex IP Meister, PLLC

(57) ABSTRACT

Provided is a vibration damper for a high load, including: a vibration body support portion having first shaft support portions; rotation shafts that are rotatably installed at the first shaft support portions, have eccentric portions eccentric with respect to rotation centers of the rotation shafts and are spaced a predetermined gap from each other; a support portion having second shaft support portions on which the eccentric portions are rotatably supported; an elastic member that is installed between the vibration body support portion and the support portion or between the vibration body support portion and the second shaft support portions and that elastically supports the support portion with respect to the vibration body support portion in an upward direction; and a rotation synchronization unit that is installed at the rotation shafts so as to synchronize rotation directions of the rotation shafts according to vibration. The vibration damper for a high load can be applied to various construction machines, and excavators and can prevent vibration generated from various attachments from being transferred to a boom or car body of an excavator or a construction machine.

3 Claims, 16 Drawing Sheets

(51) Int. Cl.
*E02F 3/36* (2006.01)
*E02F 3/96* (2006.01)

(52) U.S. Cl.
CPC .......... *E02F 3/3622* (2013.01); *E02F 3/3663* (2013.01); *E02F 3/966* (2013.01); *E02F 3/967* (2013.01); *E02F 5/326* (2013.01)

(58) Field of Classification Search
CPC . E02F 5/3613; E02F 5/405; E02F 3/36; E02F 3/3604; E02F 3/3613; E02F 3/405
See application file for complete search history.

(56) References Cited

FOREIGN PATENT DOCUMENTS

| | | | | |
|---|---|---|---|---|
| JP | 09-105236 | | 4/1997 | |
| KR | 20-0433903 | | 12/2006 | |
| KR | 10-0974055 | | 7/2010 | |
| KR | 10-1025030 | | 3/2011 | |
| KR | 10-1158101 | * | 6/2012 | ................ E02F 5/32 |
| KR | 10-1178276 | * | 8/2012 | ................ E02D 7/20 |
| KR | 10-2012-0125916 | * | 11/2012 | ................ E02F 5/32 |
| KR | 10-1236510 | * | 2/2013 | ................ E02F 5/32 |
| KR | 10-2014-0010771 | | 1/2014 | |

* cited by examiner

VIBRATION DAMPER FOR HIGH LOAD

TECHNICAL FIELD

The present invention relates to a vibration damper, and more particularly, to a vibration damper for a high load that is capable of preventing vibration generated from a vibration generation source from being transferred to the other side.

BACKGROUND ART

In general, vibration models having various shapes have been suggested and put to practical use in construction machines, excavators, vibro rippers, and vehicles. Vibration characteristics generally include load mass dependency and input dependency. Load mass dependency is related to a curvature of load-displacement characteristics, and input dependency is related to hysteresis of the load-displacement characteristics.

For example, metal springs, air springs, rubber for protection against dust, or shock absorbers are used in dust removing units that prevent vibration generated from vibration generation sources such as construction machines, excavator hydraulic breakers, or vibro rippers from being transferred to a boom or car body. When soft springs are used in dust removing units, a resonance point is moved to a low frequency but vibration transmissibility is increased. When transmissibility of the resonance point is reduced, a damping ratio of a damper needs to be increased. However, when the damping ratio of the damper is increased, transmissibility of a high frequency is increased. Thus, performance of a conventional passive vibration model is limited. Active control is required for optimization in all conditions.

Korean Registration Patent No. 10-0331934 discloses a vibration mechanism using a magnetic spring, and Korean Patent Registration No. 0161564 discloses a hydraulic breaker damping device.

PRIOR-ART DOCUMENT

Patent Document

Korean Registration Patent No. 10-0331934
Korean Patent Registration No. 0161564

DISCLOSURE

Technical Problem

The present invention is directed to providing a vibration damper for a high load that is capable of preventing vibration generated from a vibration generation source from being transferred to the other side.

The present invention is also directed to providing a vibration damper for a high load that is installed between a boom of a construction machine, such as an excavator, and attachments and is capable of preventing vibration generated from the attachments from being transferred to the boom or a car body.

The present invention is also directed to providing a vibration damper for a high load that is coupled to attachments, such as a vibro ripper and a hydraulic breaker of a construction machine, and is capable of activating vibration generated from the attachments.

The present invention is also directed to providing a vibration damper for a high load that is capable of improving functions of attachments by activating vibration generated from a vibration generation source installed at the attachments.

Technical Solution

One aspect of the present invention provides a vibration damper for a high load, including: a vibration body support portion having first shaft support portions; rotation shafts that are rotatably installed at the first shaft support portions and have eccentric portions eccentric with respect to rotation centers of the rotation shafts; a support portion having second shaft support portions on which the eccentric portions are rotatably supported; and an elastic member that is installed between the vibration body support portion and the support portion or between the vibration body support portion and the second shaft support portions and that elastically supports the support portion with respect to the vibration body support portion, wherein each of the rotation shafts may include: first and second links that are respectively installed in a radial direction from each rotation shaft; and connection links that connect the first and second links.

The elastic member may be installed between the vibration body support portion and the connection links or between the first and second shaft support portions. The vibration damper may further include an amplitude limitation unit that is installed at one side of the vibration body support portion and limits displacement caused by amplitudes or loads of the connection links.

Another aspect of the present invention provides a vibration damper for a high load, including: a vibration body support portion having first shaft support portions; rotation shafts that are rotatably installed at the first shaft support portions, have eccentric portions eccentric with respect to rotation centers of the rotation shafts and are spaced a predetermined gap from each other; a support portion having second shaft support portions on which the eccentric portions are rotatably supported; an elastic member that is installed between the vibration body support portion and the support portion or between the vibration body support portion and the second shaft support portions and that elastically supports the support portion with respect to the vibration body support portion in an upward direction; and a rotation synchronization unit that is installed at the rotation shafts so as to synchronize rotation directions of the rotation shafts according to vibration.

Still another aspect of the present invention provides a vibration damper for a high load, including: rotation shafts that are rotatably installed at both sides of an attachment body, have eccentric portions eccentric with respect to rotation centers of the rotation shafts and are spaced a predetermined gap from each other; a support portion that has second shaft support portions on which the eccentric portions are rotatably supported and that is connected to a boom of an excavator; an elastic member that is installed between the attachment body and the support portion and that elastically supports the support portion with respect to the attachment body in an upward direction; and a rotation synchronization unit that is installed at the rotation shafts so as to synchronize rotation directions of the rotation shafts according to vibration.

Advantageous Effects

In a vibration damper for a high load according to the present invention, vibration generated in a vibration body support portion or a support portion connected to a boom of an excavator, an attachment or a vibration generation source can be prevented from being transferred to the other side, i.e., a second bracket, and vibration generated from the vibration generation source of the attachment installed at the vibration body support portion can be activated.

Furthermore, in the vibration damper for a high load according to the present invention, when the vibration damper for a high load is applied to various attachments installed at a construction machine, such as an excavator, vibration generated from the attachments can be prevented from being transferred to the boom of the excavator, and when various attachments are manufactured, structures of the attachments can be simplified. In particular, a problem caused by vibration transfer can be fundamentally solved so that a degree of freedom of design can be increased.

MODES OF THE INVENTION

Figure 1:
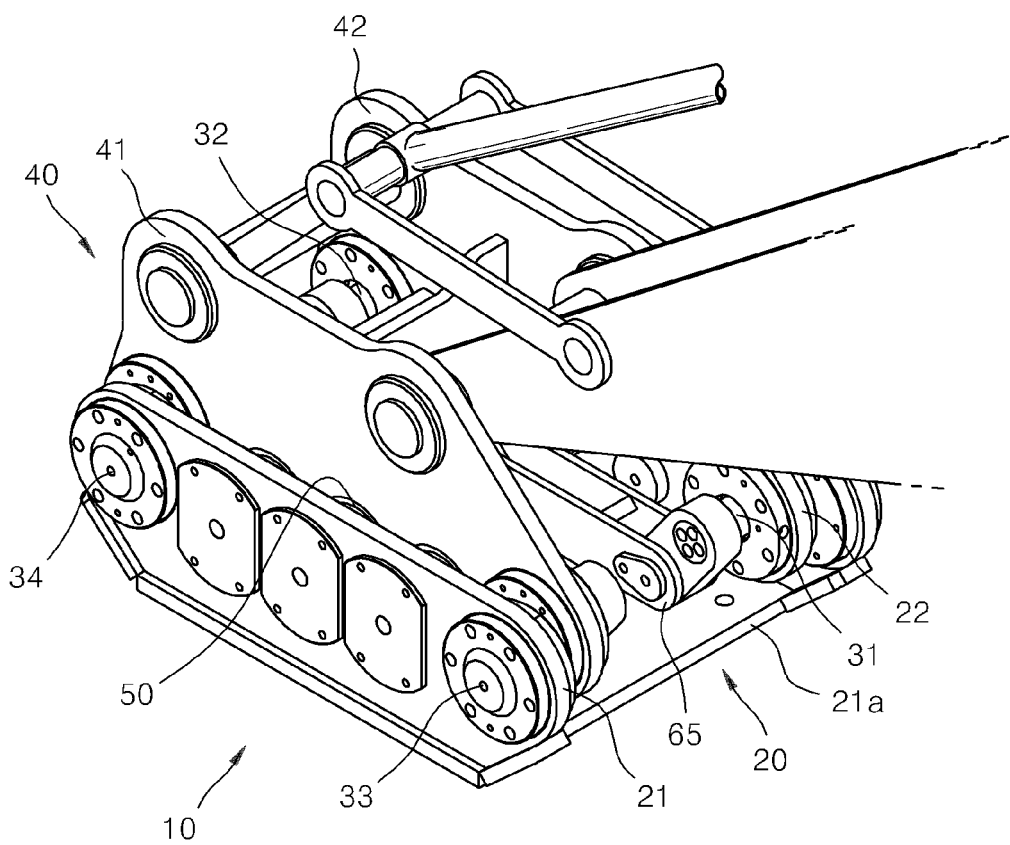
FIG. 1 is a perspective view of a vibration damper for a high load according to an embodiment of the present invention.

A vibration damper for a high load according to embodiments of the present invention is provided to prevent vibration generated from a vibration generation source from being transferred to the other side. Embodiments of the vibration damper for a high load are illustrated in FIGS. 1 through 4.

Referring to the drawings, a vibration damper 10 for a high load according to an embodiment of the present invention includes a vibration body support portion 20 having first shaft support portions 21 and 22. The first shaft support portions 21 and 22 of the vibration body support portion 20 may include plate-shaped members that are installed at both sides of a vibration body support portion body 20a in parallel to each other.

Rotation shafts 31, 32, 33 and 34 are rotatably installed at both ends of each of the first shaft support portions 21 and 22. Two rotation shafts are installed at each of the first shaft support portions 21 and 22 so as to be spaced a predetermined gap from each other (see FIG. 2). However, embodiments of the present invention are not limited thereto, and two rotation shafts may be supported on each of shaft support portions in parallel and may be installed not to be placed in a line of a horizontal axis of positions at which two rotation shafts are installed.

Eccentric portions 31a, 32a, 33a and 34a, rotation centers of which are eccentric with respect to rotation centers of each of the rotation shafts 31, 32, 33 and 34, are provided at each of the rotation shafts 31, 32, 33 and 34. The eccentric portions 31a, 32a, 33a and 34a formed at each of the rotation shafts 31, 32, 33 and 34 may be formed in the same direction (a radial direction that is the same as center directions of rotation shafts) or in different directions. Second shaft support portions 41 and 42 of a support portion 40 installed at a boom of an excavator are supported on the eccentric portions 31a, 32a, 33a and 34a of the rotation shafts 31, 32, 33 and 34 that are rotatably installed at the first shaft support portions 21 and 22. The eccentric portions 31a, 32a, 33a and 34a are rotatably supported on two second shaft support portions 41 and 42 that are installed to correspond to the first shaft support portions 21 and 22.

An elastic member 50 is installed between the vibration body support portion 20 and the support portion 40 or between the first shaft support portions 21 and 22 and the second shaft support portions 41 and 42 so as to elastically support the support portion 40 with respect to the vibration body support portion 20.

Figure 2:
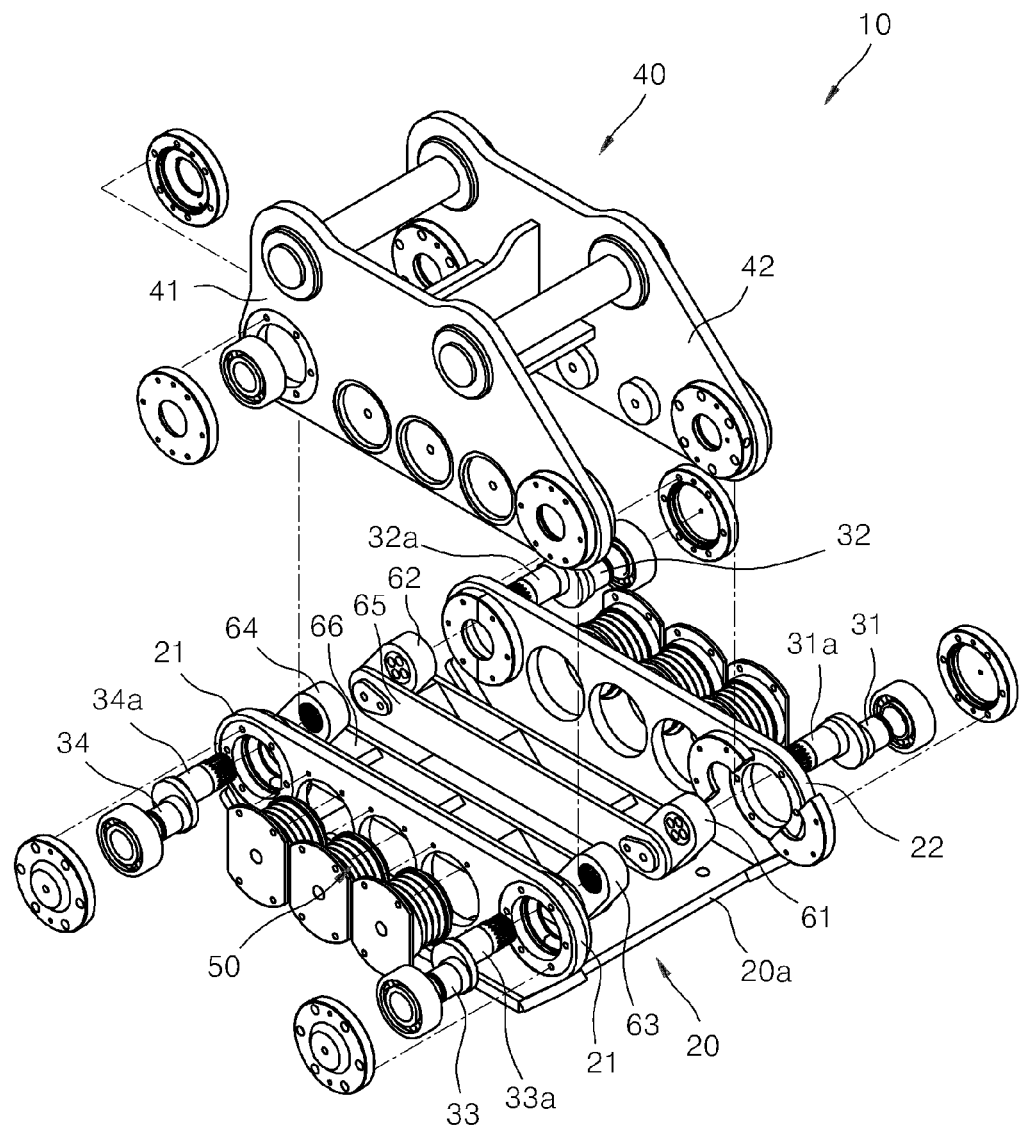
FIG. 2 is an exploded perspective view of a vibration damper for a high load illustrated in FIG. 1.
Figure 5:
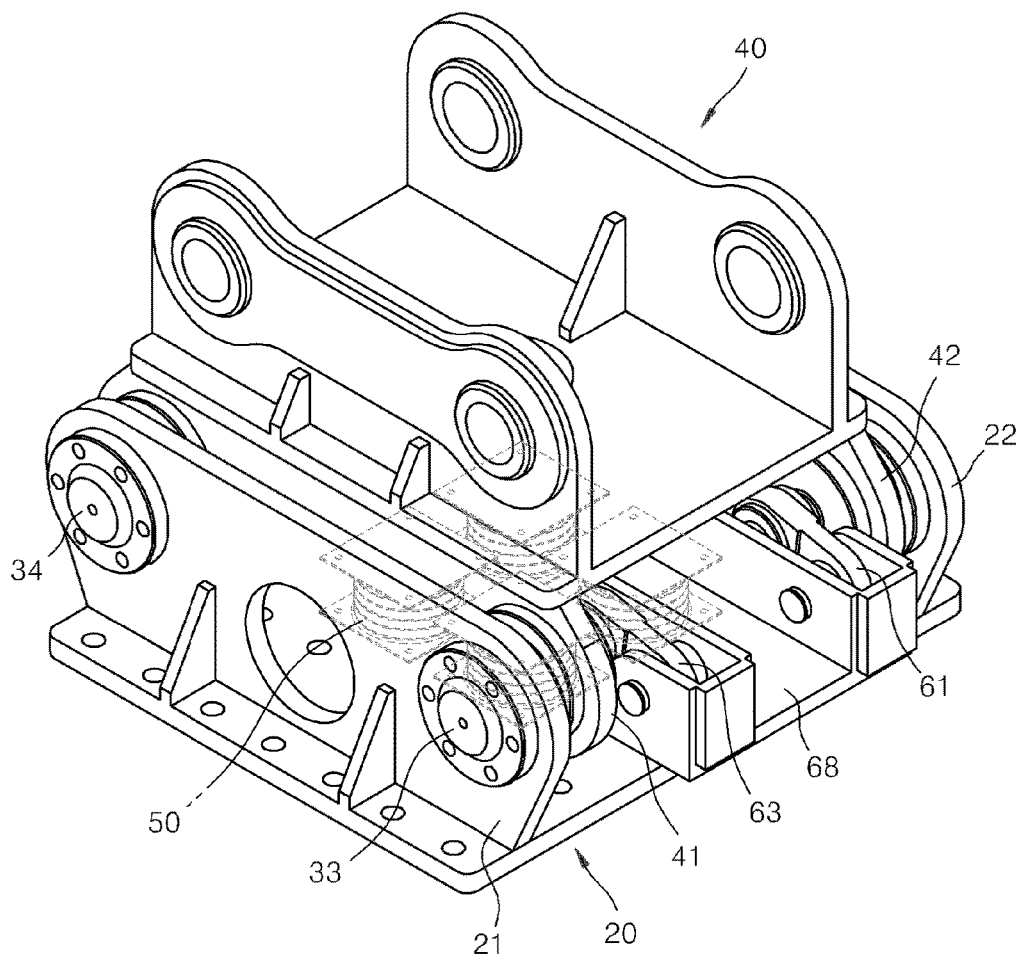
FIG. 5 is a perspective view of a vibration damper for a high load according to another embodiment of the present invention.
Figure 6:
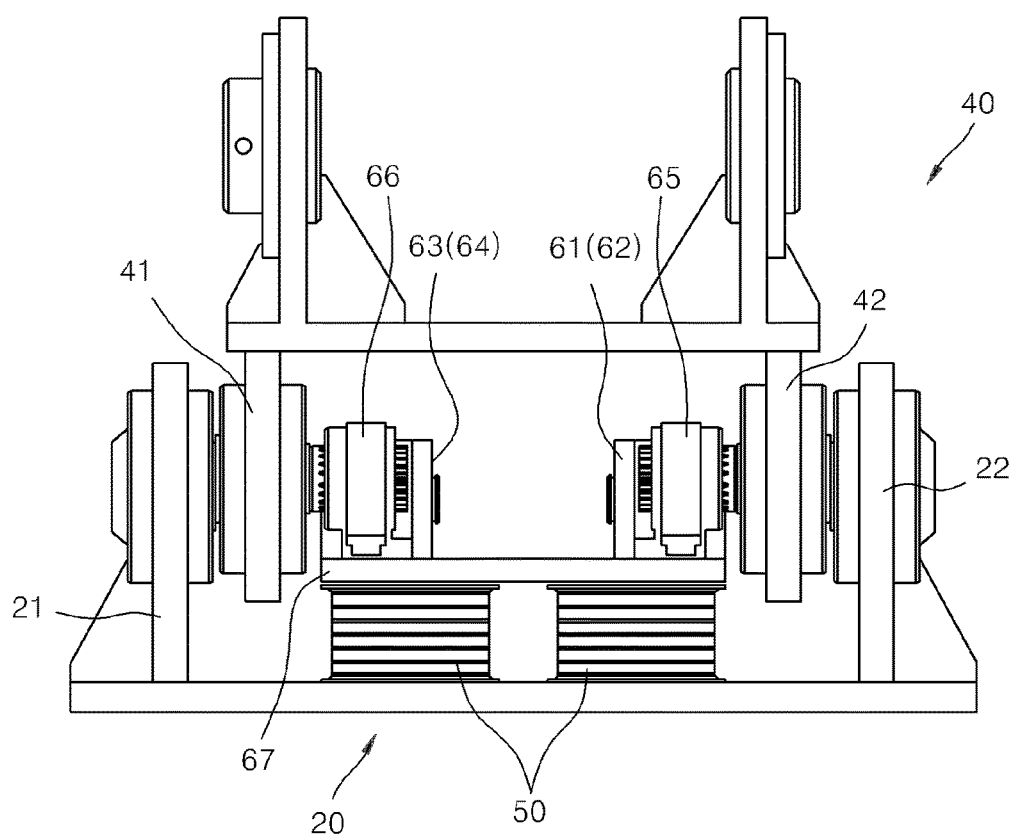
FIG. 6 is a side view of the vibration damper for a high load illustrated in FIG. 5.

The elastic member 50 is used to elastically support the support portion 40 connected to the boom of the excavator with respect to the vibration body support portion 20, as described above, and is installed between the first shaft support portions 21 and 22 and the second shaft support portions 41 and 42, as illustrated in FIGS. 1 and 2. The elastic member 50 is installed in such a way that both ends of the elastic member 50 are fixed to the first shaft support portions 21 and 22 and the second shaft support portions 41 and 42 in a state in which the elastic member 50 is interposed between the first shaft support portions 21 and 22 and the second shaft support portions 41 and 42. Installation of the elastic member 50 is not limited to the above-described embodiment, and the elastic member 50 may be installed between first and second connection links and the vibration body support portion body 20a or between a connection plate 67 and the vibration body support portion body 20a, as illustrated in FIGS. 5 and 6.

The elastic member 50 may be formed as at least one selected from the group consisting of elastic rubber, a shock absorber, an elastic spring, an air spring, and an air tube. However, embodiments of the present invention are not limited thereto, and a structure in which the support portion 40 can be elastically supported with respect to the vibration body support portion 20 in an upward direction may be used as the elastic member 50. For example, the elastic member 50 may be installed between the vibration body support portion 20 and the support portion 40, and a plurality of hydraulic or gas shock absorbers may be installed at the vibration body support portion 20 and the support portion 40.

Figure 12:
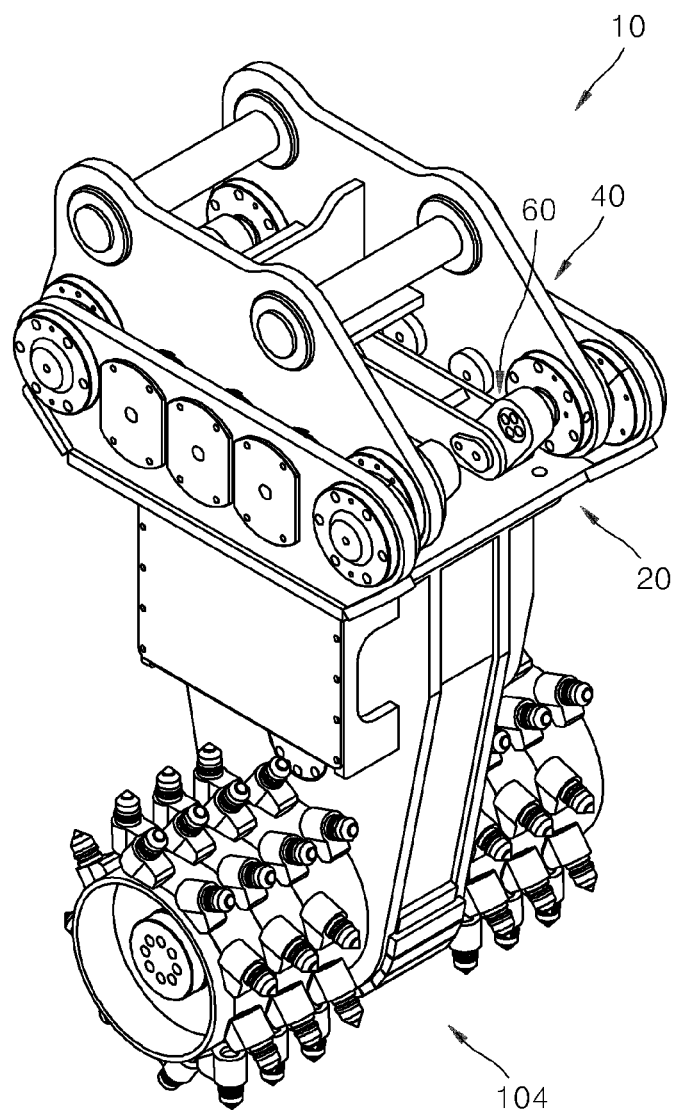
FIG. 12 is a perspective view illustrating a state in which a milling cutter is installed at the vibration damper for a high load of FIG. 5.
Figure 13:
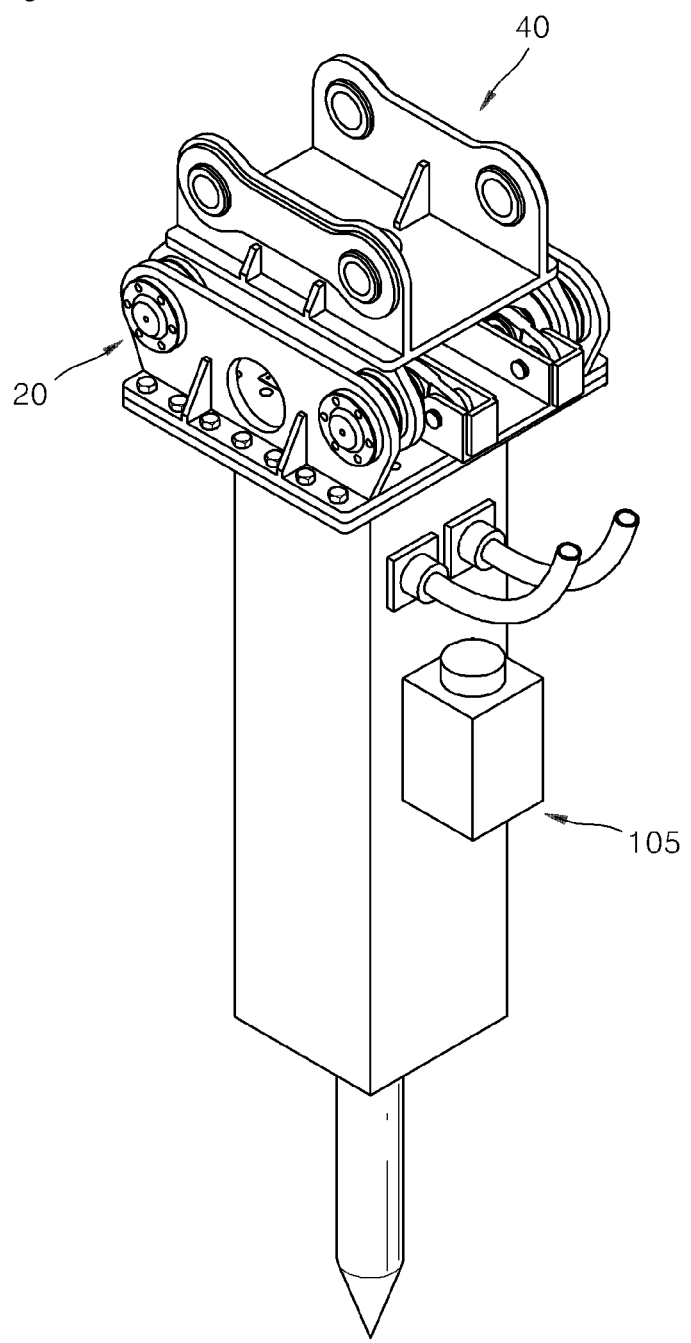
FIG. 13 is a perspective view illustrating a state in which a hydraulic breaker is installed at the vibration damper for a high load of FIG. 5.
Figure 14:
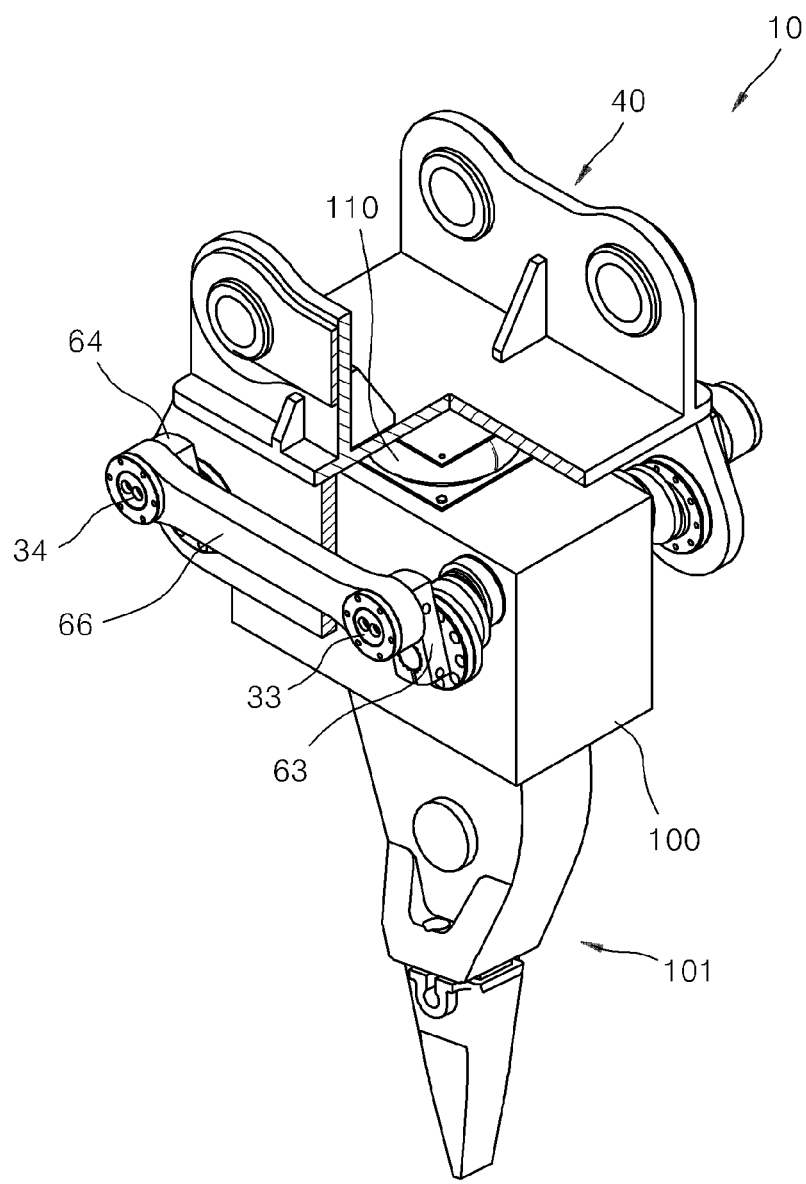
FIG. 14 is a partial cut perspective view illustrating a state in which the vibration damper for a high load of FIG. 5 is installed at an attachment body of an excavator.

A rotation synchronization unit (see 60 of FIG. 12) is provided to be installed at the rotation shafts 31 to 34 so as to synchronize rotation directions of the rotation shafts 31 to 34.

Figure 3:
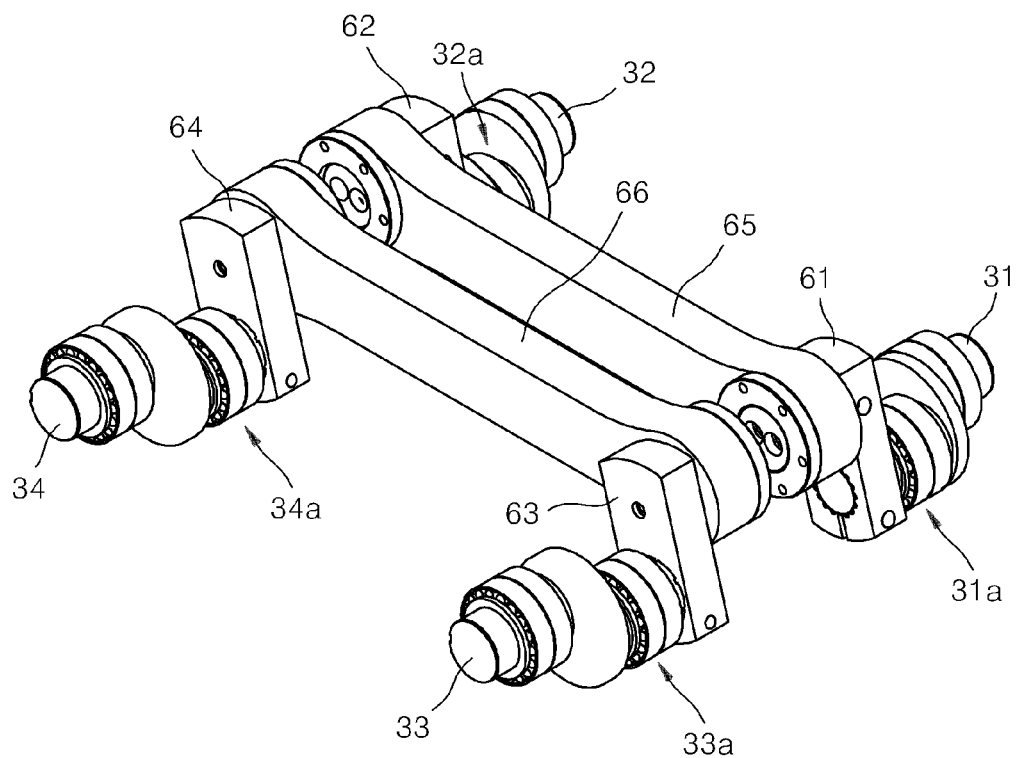
FIG. 3 is a perspective view illustrating a state in which rotation shafts illustrated in FIG. 1 are connected to each other by a rotation synchronization unit according to an embodiment of the present invention.
Figure 4:
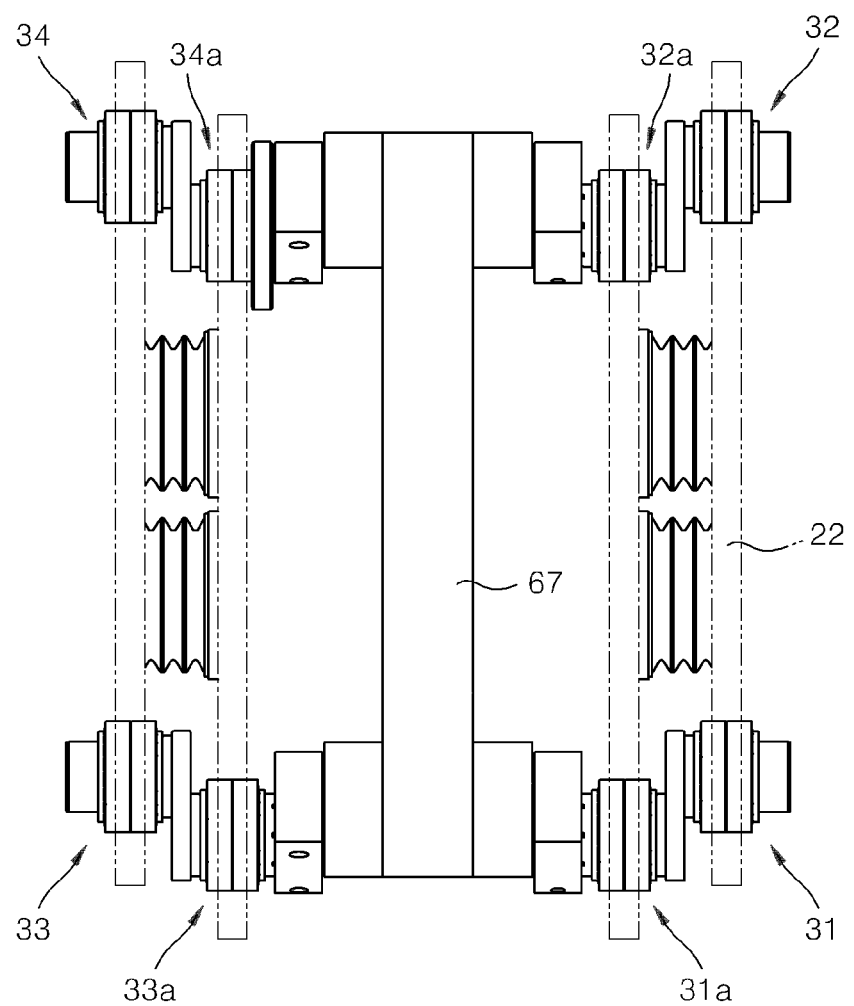
FIG. 4 is a plan view illustrating a state in which the rotation shafts are connected to each other by the rotation synchronization unit according to another embodiment of the present invention.

The rotation synchronization unit 60 is configured in such a way that first links 61 and 62 are installed at ends of one-side eccentric portions 31a and 32a among the eccentric portions 31a, 32a, 33a and 34a and second links 63 and 64 are installed at ends of the other-side eccentric portions 33a and 34a, as illustrated in FIGS. 2 and 3. Ends of the first links 61 and 62 and ends of the second links 63 and 64 are connected to each other using first and second connection links 65 and 66. However, embodiments of the present invention are not limited thereto, and the first and second links 61, 62, 63 and 64 may be connected to each other using one third connection link 67, as illustrated in FIG. 4.

The rotation synchronization unit 60 for synchronizing rotation of the rotation shafts 31 to 34 is not limited by the above-described embodiment and may be configured so that ends of adjacent sides to the eccentric portions 31a to 34a of each of the rotation shafts 31 to 34 are rotatably connected to the above-described connection links. Through synchronization of the rotation shafts 31 to 34, when an eccentric load is applied to the vibration body support portion 20 and the support portion 40, a vibration attenuation phenomenon can be prevented from being dispersed.

As illustrated in FIGS. 5 and 6, the first and second links 61, 62, 63 and 64 may be connected to each other using a connection plate 68 and may be installed to be pivoted by one connection plate 68.

As described above, when the first links 61 and 62 are coupled to each other using the first connection link and the second links 63 and 64 are coupled to the second connection link 62, the first and second links 61, 62, 63 and 64 may be coupled to the first and second connection links 65 and 66 in a state in which the first and second links 61, 62, 63 and 64 are inclined at a predetermined angle with respect to a vertical axis in the same direction. Coupling of one connection plate 68 and the first and second links 61, 62, 63 and 64 is also performed by a hinge shaft in a state in which the first and second links 61, 62, 63 and 64 are inclined with respect to the vertical axis, as described above.

Figure 7:
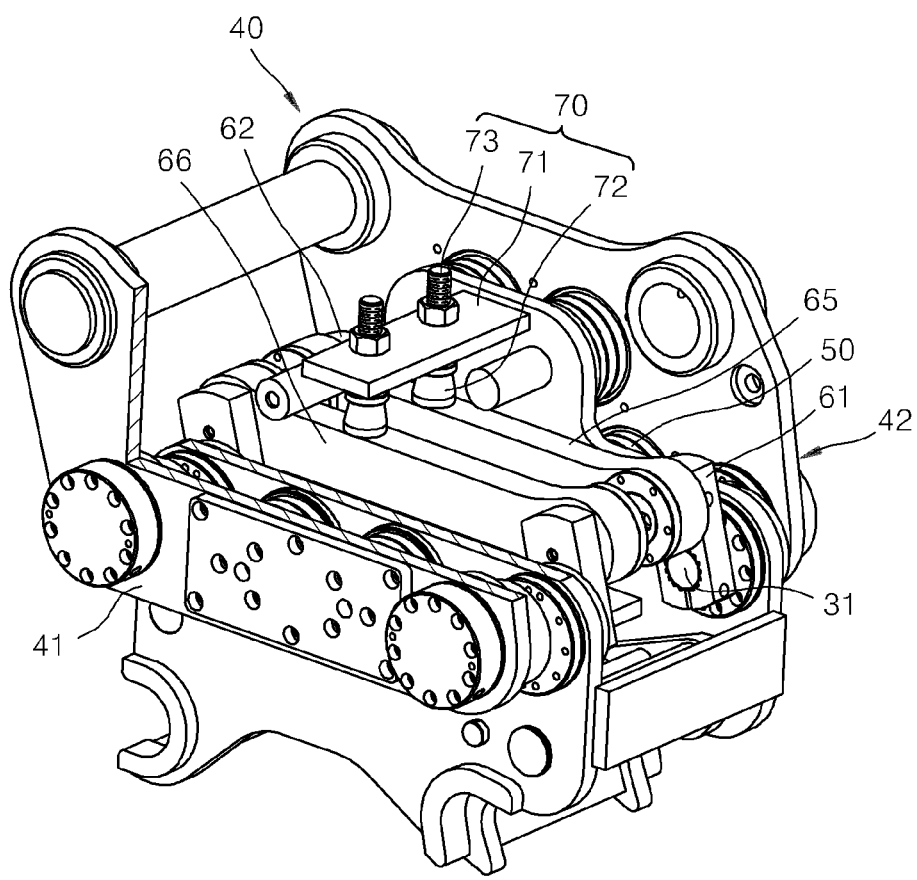
FIG. 7 is a perspective view illustrating a state in which an amplitude limitation unit is installed at the vibration damper for a high load of FIG. 5.

As illustrated in FIG. 7, an amplitude limitation unit 70 is further provided at one side of the vibration body support portion 20 so as to limit movement displacement caused by amplitudes or loads of the first and second connection links 65 and 66 or the third connection link 67 for synchronizing rotation of the rotation shafts 31 to 34. The amplitude limitation unit 70 includes a support bracket 71 that extends from one side of the vibration body support portion 20 to an upper side of the first and second connection links 65 and 66 or the third connection link 67 of the rotation synchronization unit 60, and elastic bodies 72 that are installed at the support bracket 71 and contact the first connection link 65 or the second connection link 66. The elastic bodies 72 are installed at ends of adjustment rods 73 that may adjust heights of the elastic bodies 72 at the support bracket 71 (that is screw-coupled to the support bracket 71) so as to adjust a distance between the elastic bodies 72 and the support bracket 71.

Although not shown, a vibration generation unit (not shown) or an attachment of a selected excavator may be installed at the vibration body support portion body 20a of the vibration body support portion 20.

The vibration generation unit is configured so that two driving shafts with attached eccentric weights are installed at a housing and gears are engaged with each other at the driving shafts. An actuator for driving at least one of the two driving shafts is installed at the housing. This configuration is disclosed in Korean Patent Registration No. 0878296 that was filed and registered by the present applicant. The vibration generation unit is not limited to the above-described embodiment, and a structure which is attached to the vibration body support portion 20 and in which an attachment having no separate vibration generation unit can be vibrated like the vibration body support portion 20 may be used as the vibration generation unit.

Figure 8:
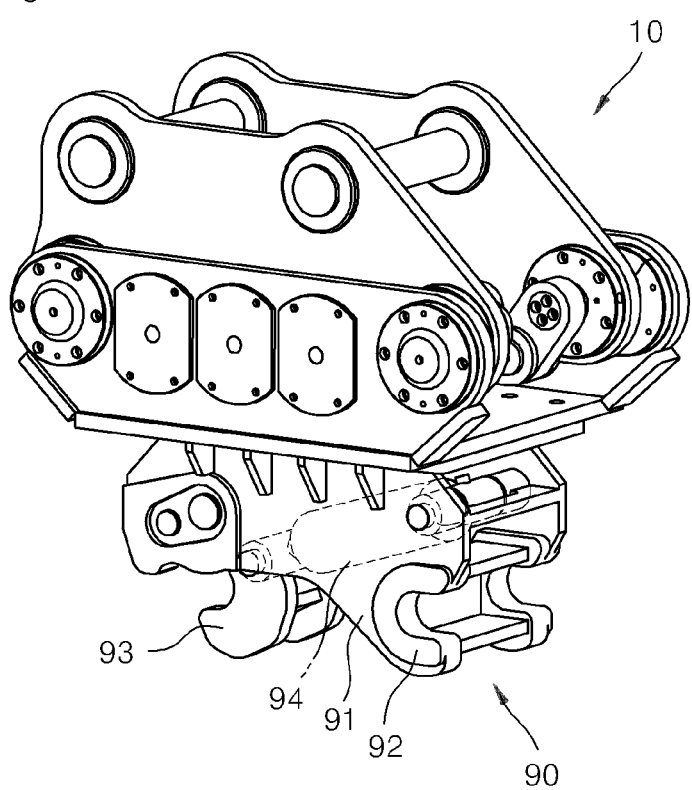
FIG. 8 is a perspective view illustrating a state in which a quick coupler is installed at the vibration damper for a high load of FIG. 5.
Figure 9:
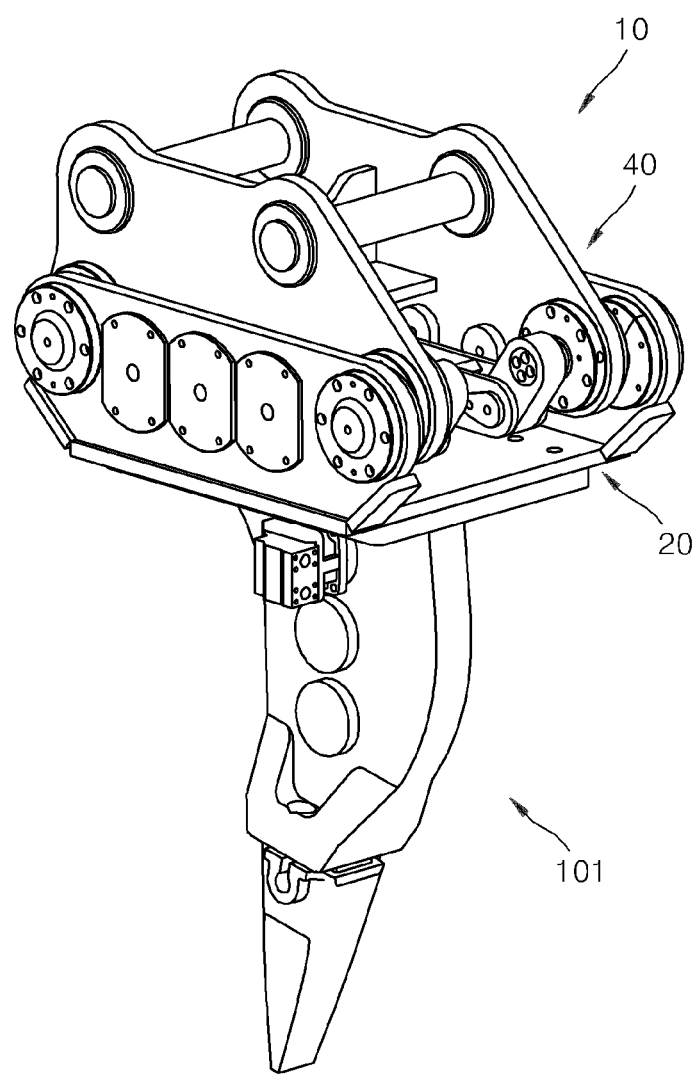
FIG. 9 is a perspective view illustrating a state in which a vibro ripper is installed at the vibration damper for a high load of FIG. 5.
Figure 10:
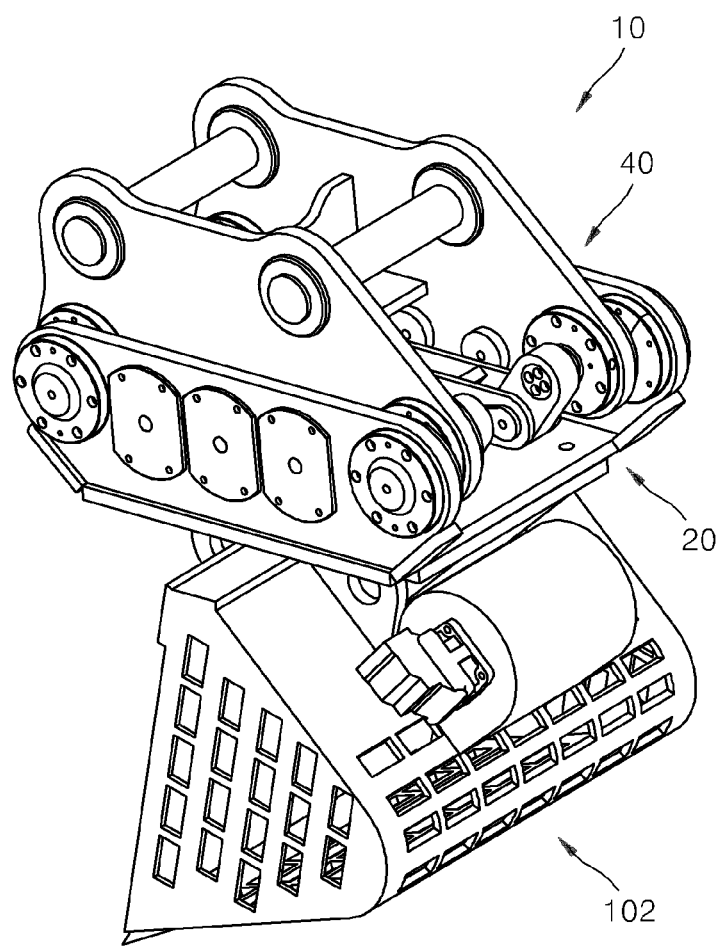
FIG. 10 is a perspective view illustrating a state in which a vibration screen bucket is installed at the vibration damper for a high load of FIG. 5.
Figure 11:
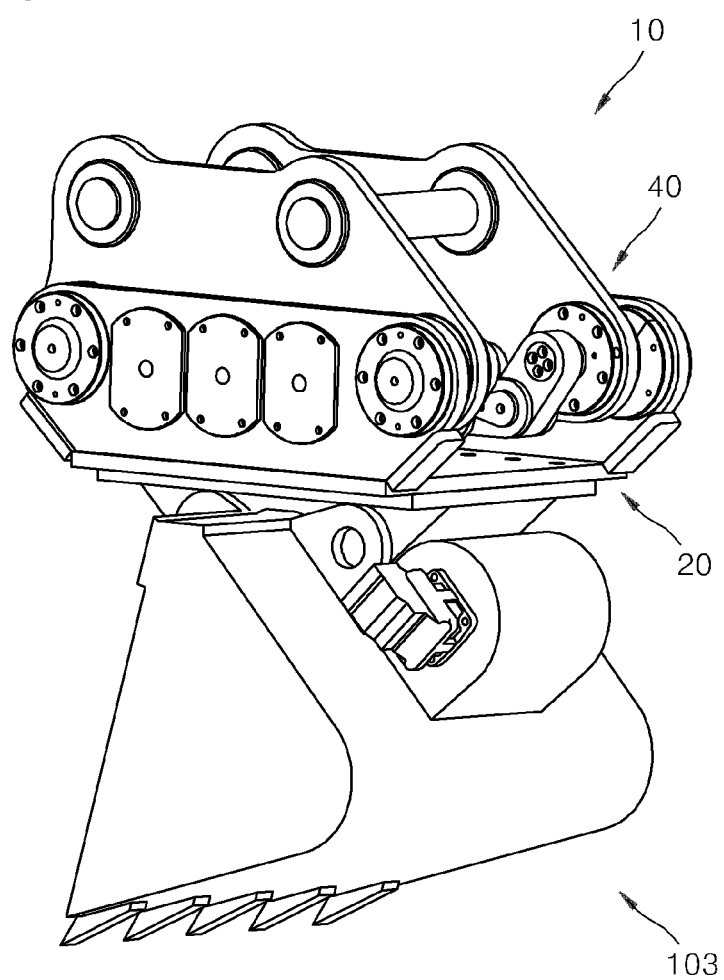
FIG. 11 is a perspective view illustrating a state in which a vibration bucket is installed at the vibration damper for a high load of FIG. 5.

As illustrated in FIG. 8, a quick coupler 90 may be installed at the vibration body support portion 20. The quick coupler 90 includes a coupler bracket 91 at which a first hanging member 92 is installed, a second hanging member 93 that is rotatably installed at the coupler bracket 91, and an actuator 94 for rotating the second hanging member 93. A hanging groove having an inner diameter corresponding to an outer diameter of a fixing pin for fixing the attachment is formed in the first hanging member 92 so that the fixing pin can be inserted into the hanging groove. The hanging groove is opened in a direction opposite to the position of the second hanging member 93. The second hanging member 93 is rotated and fixed by the actuator 94.

Various attachments that are mounted on the excavator to extend workability may be installed at the vibration body support portion body 20a of the vibration body support portion 20, as described above. These attachments may be coupled to each other using the quick coupler 90. As illustrated in FIG. 7, rotation shafts may be rotatably installed at the coupler bracket 91 of the quick coupler 90.

Well-known attachments, such as a vibro ripper 101 having a separate vibration generation unit, a vibration screen bucket 102, a vibration bucket 103, a milling cutter 104, a compactor, and a hydraulic breaker 105, may be installed, as illustrated in FIGS. 10 through 14. Here, it is obvious that, when a separate attachment has no separate vibration generation unit, a vibration generation unit may be installed at the vibration body support portion 20 so as to vibrate the attachment, as described above.

Figure 15:
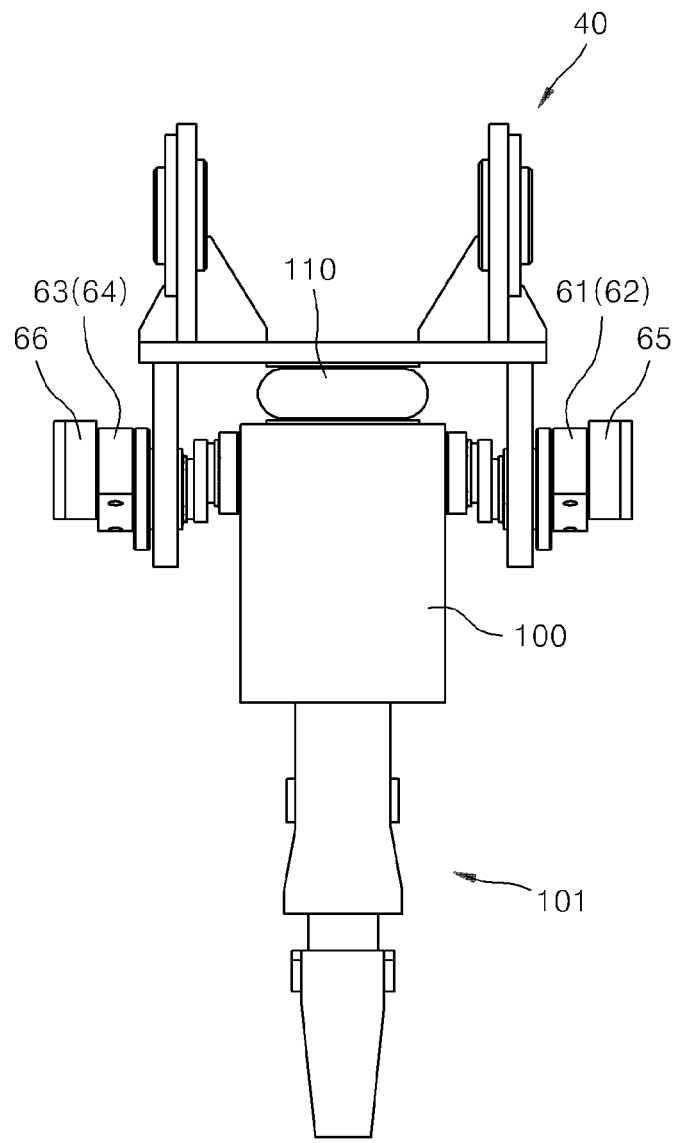
FIG. 15 is a side view of the vibration damper for a high load illustrated in FIG. 14.
Figure 16:
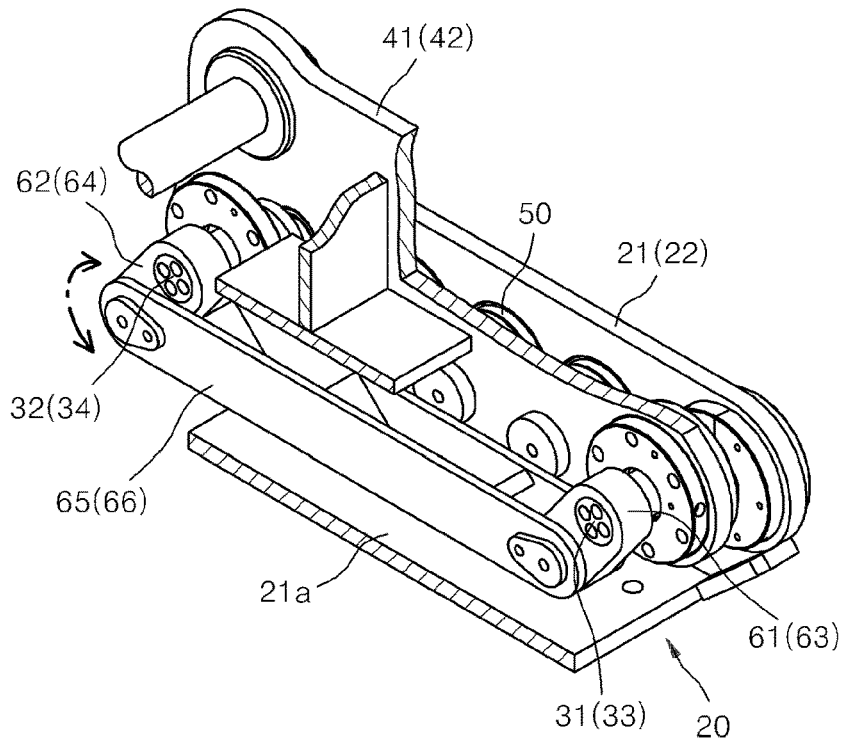
FIG. 16 is a partial cut perspective view illustrating an operating state of the vibration damper for a high load of FIG. 14.
Figure 17:
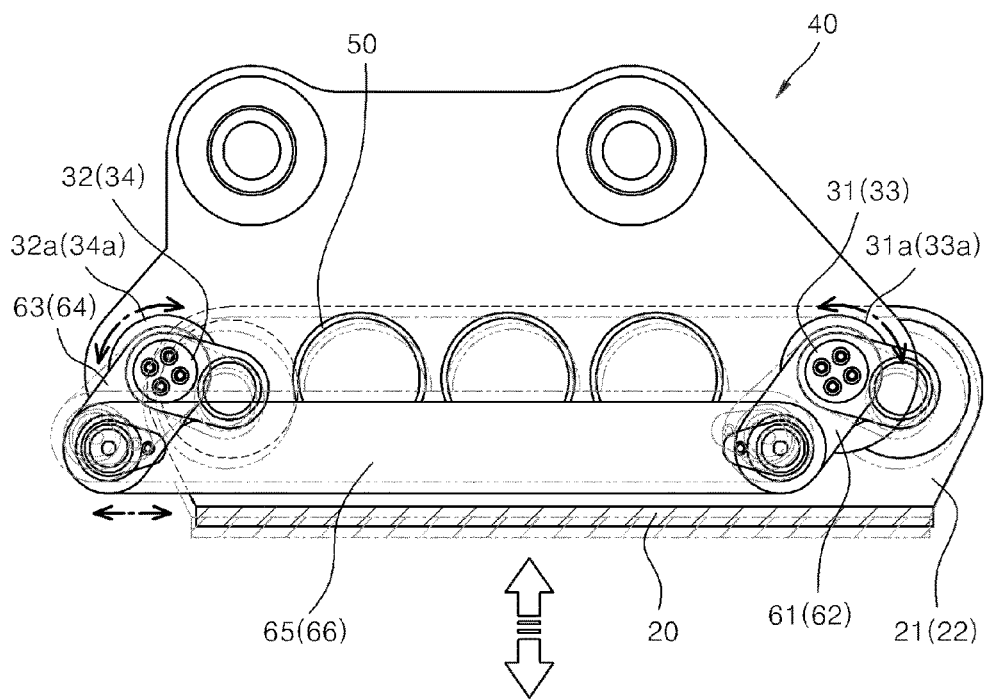
FIG. 17 is a side view illustrating an operating state of the vibration damper for a high load of FIG. 14.

FIGS. 15 and 16 illustrate a vibration damper for a high load according to another embodiment of the present invention. In the current embodiment, like reference numerals with FIG. 1 represent like elements.

Referring to the drawings, in a vibration damper 10 for a high load according to another embodiment of the present invention, rotation shafts 31, 32, 33, and 34 having eccentric portions 31a, 32a, 33a, and 34a formed therein are rotatably installed at both sides of an attachment body 100. The eccentric portions 31a, 32a, 33a, and 34a of the rotation shafts 31, 33, 33, and 34 are rotatably installed at first shaft support portions of a support portion 40 connected to a boom of an excavator.

A rotation synchronization unit 60 for synchronizing rotation of each of the rotation shafts 31, 32, 33, and 34 is installed at an outer side of each of the first shaft support portions 41 and 42 of the support portion 40. The rotation synchronization unit 60 is substantially the same as that of the above-described embodiment. That is, first links 61 and 62 are installed at ends of the rotation shafts 31 and 32 supported at one side of an attachment, and second links 63 and 64 are installed at ends of the rotation shafts 33 and 34 installed at the other side of the attachment. First and second connection links 65 and 66 are installed at each of the first links 61 and 62 and the second links 63 and 64. An elastic member 110 is installed between a top surface of the attachment body 100 and a bottom surface of the support portion 40. Installation of the elastic member 110 is not limited to the above-described embodiment, and the elastic member 110 may be installed between sides of the attachment body 100 and inner sides of the first shaft support portions 41 and 42 of the support portion 40.

As described above, when the vibration damper 10 for a high load supports one side of each of the rotation shafts 31, 32, 33, and 34 at both sides of the attachment body 100, a structure of the vibration damper 10 for a high load can be simplified, and the vibration damper 10 for a high load can be made small.

An operation of the vibration damper for a high load having the above configuration according to the present invention will be described with reference to FIGS. 1 through 4 and FIGS. 17 and 18.

In the vibration damper 10 according to the present invention, in a state in which the support portion 40 is installed at the boom of the excavator and the vibration generation unit or the attachment of the excavator is installed at the vibration body support portion 20, the vibration body support portion 20 is vibrated in a vertical direction due to vibration generated from the vibration generation unit or attachment. A vibration attenuation operation will be divided into movement in an upward direction of the vibration body support portion 20 and movement in a downward direction of the vibration body support portion 20 and will be described below.

First, if vibration is transferred to the vibration body support portion 20, the vibration body support portion 20 is moved in the upward direction, rotates the rotation shafts 31, 32, 33 and 34, and absorbs vibration, and vibration is absorbed when the elastic member 50 is elongated. That is, when the vibration body support portion 20 is moved to the support portion 40 connected to the boom of the excavator due to vibration of the vibration body support portion 20, the rotation shafts 31, 32, 33 and 34 are rotated by the eccentric portions 31a, 32a, 33a, and 34a of the rotation shafts 31, 32, 33 and 34 that connect and support the vibration body support portion 20 and the support portion 40 so that movement displacement of the vibration body support portion 20 can be prevented from being transferred to the support portion 40.

In this procedure, the elastic member 50 that is installed between the vibration body support portion 20 and the support portion 40, i.e., between first shaft support portions 21 and 22 and second shaft support portions 41 and 52 or at lower portions of the first and second connection links 65 and 66 and the vibration body support portion body 20a, is elongated and attenuates rotational force of the rotation shafts 31 to 34 (increases rotation loads of the rotation shafts 31 to 34) so that vibration is absorbed in the vertical direction. In this case, the support portion 40 maintains a current positional state due to an inertial force.

In particular, when the rotation shafts 31, 32, 33 and 34 are rotated, first and second links 61, 62, 63 and 64 that connect the rotation shafts 31, 32, 33 and 34 and first connection links 65 and 66 are maintained in a state in which the first and second links 61, 62, 63 and 64 are inclined at a predetermined angle with respect to the vertical direction in the same direction so that rotation of the rotation shafts 31, 32, 33 and 34 can be smoothly performed when the vibration body support portion 20 is moved in the upward direction.

When the vibration body support portion 20 descends due to vibration transferred to the vibration body support portion 20, one side of a rotation shaft is supported on the first shaft support portions 21 and 22 of the vibration body support portion 20, and the second shaft support portions 41 and 42 of the support portion 40 are supported on the eccentric portions 31a, 32, 33a and 34a of the rotation shafts 31, 32, 33 and 34. Thus, movement displacement of the vibration body support portion 40 that descends due to the eccentric portions 31a, 32a, 33a and 34a of the rotation shafts 31, 32, 33 and 34 is prevented from being transferred to the support portion 40. In this procedure, the elastic member 50 that is installed between the vibration body support portion 20 and the support portion 40, i.e., between the first shaft support portions 21 and 22 and the second shaft support portions 41 and 42 or at lower portions of the first and second connection links 65 and 66 and the vibration body support portion body 20a, is compressed and attenuates rotational force of the rotation shafts 31 to 34 (increases rotation loads of the rotation shafts 31 to 34) so that vibration is absorbed in the upward direction.

When concentrative eccentric loads are applied to one-side rotation shafts 31 and 33 among the rotation shafts 31 to 34 that connect the support portion 40 and the vibration body support portion 20 in a state in which the vibration damper for a high load is installed at the boom, one-side rotation shafts 31 and 33 are rotated, and the second and third links 62 and 64 are rotated by the first and third links 61 and 63 and the first connection links 65 and 66 installed at the rotation shafts 31 and 33 so that the eccentric loads applied to one-side rotation shafts 31 and 33 are dispersed. Thus, even when the eccentric loads are applied to one-side rotation shafts 31 and 33, due to rotation of one-side rotation shafts 31 and 33, movement displacement can be prevented from being concentrated on the vibration body support portion 20 or the support portion 40, and furthermore, working force applied to the elastic member 50 is dispersed.

Through the above-described operation, vibration transferred to the vibration body support portion 20 can be prevented from being transferred to the support portion 40.

When the support portion 40 of the vibration damper 10 according to the present invention is installed at the boom of the excavator and one selected from the group consisting of well-known attachments, such as a vibration bucket having a vibration generation unit, a vibro ripper, a vibration screen bucket, a compactor, a hydraulic breaker, a milling cutter, and a jaw crusher, is installed at the vibration body support portion 20 of the vibration damper 10 for a high load, vibration generated from an attachment can be prevented from being transferred to the boom of the excavator through the above-described operation.

In the vibration damper 10 according to the present invention, a vibration generation unit is installed at the vibration body support portion 20 so that an attachment, such as a tamping board having no separate vibration generation unit, can also be installed.

INDUSTRIAL APPLICABILITY

A vibration damper for a high load according to the present invention can be widely used to attenuate vibration of a construction machine, an excavator, an industrial machine, and a car, and in particular, can be applied to attachments including the excavator and heavy equipment so that a degree of freedom of design of attachments can be increased.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A vibration damper for a high load, comprising:
   a vibration body support portion having a pair of parallel plate-shaped first shaft support portions, each having a pair of through holes at opposing ends thereof;
   a pair of parallel first and second rotation shafts, each of the first and second shafts having a first shaft portion rotatably installed within one of the through holes of a respective one of the first shaft support portions and having an eccentric shaft portion parallel to and eccentric with respect to a rotation center of the first shaft portion;
   a support portion having a pair of parallel plate-shaped second shaft support portions, each having a pair of through holes at opposing ends thereof in which the eccentric shaft portion of a respective one of the first and second rotation shafts is rotatably supported;
   an elastic member that is installed between the vibration body support portion and the support portion and connects the first shaft support portions to the second shaft support portions, wherein the elastic member elastically supports the support portion with respect to the vibration body support portion;
   a first link pivotably connected to a distal end of the eccentric shaft portion of each of the first rotation shafts;
   a second link pivotably connected to a distal end of the eccentric shaft portion of each of the second rotation shafts;
   a connection link that connects each pair of corresponding first and second links, wherein opposing ends of the connection link are pivotably connected to the first and second links; and
   a quick coupler that is fixed to the vibration body support portion and comprises a coupler bracket at which a first hanging member is installed, a second hanging member that is rotatably installed at the coupler bracket, and an actuator for rotating the second hanging member,
   wherein the quick coupler is fixed to a bottom side of the vibration body support portion, which is opposite to a side where the first shaft support portions are disposed.

2. The vibration damper of claim 1, further comprising an amplitude limitation unit that is installed at one side of the vibration body support portion and limits displacement caused by amplitudes or loads of the connection links,
   wherein the amplitude limitation unit comprises:
   a support bracket that extends from one side of the vibration body support portion; and
   elastic bodies that are installed at the support bracket and contact the connection link.

3. The vibration damper of claim 1, wherein one selected from the group consisting of a vibration bucket, a vibro ripper, a screen bucket, a compactor, a hydraulic breaker, a milling cutter, and a jaw crusher is installed at the vibration body support portion.

* * * * *